United States Patent
Yuen et al.

(10) Patent No.: US 11,433,335 B2
(45) Date of Patent: Sep. 6, 2022

(54) SUCTION ASSEMBLY FOR A CENTRIFUGAL AIR FILTER

(71) Applicant: DEERE & COMPANY, Moline, IL (US)

(72) Inventors: Ming Parker Yuen, Heidelberg (DE); Alexander Berg, Mannheim (DE); Phouphadeth Sananikone, Ludwigshafen (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/148,021

(22) Filed: Jan. 13, 2021

(65) Prior Publication Data

US 2021/0229014 A1 Jul. 29, 2021

(30) Foreign Application Priority Data

Jan. 27, 2020 (DE) .......................... 102020200950.3

(51) Int. Cl.
| | | |
|---|---|---|
| *B01D 45/12* | (2006.01) | |
| *B01D 46/24* | (2006.01) | |
| *F04D 29/00* | (2006.01) | |
| *F01P 5/06* | (2006.01) | |

(52) U.S. Cl.
CPC ......... *B01D 45/12* (2013.01); *B01D 46/2403* (2013.01); *B01D 2279/60* (2013.01); *F01P 5/06* (2013.01); *F04D 29/002* (2013.01)

(58) Field of Classification Search
CPC ............... B01D 45/12; B01D 46/2403; B01D 2279/60; F01P 5/06; F04D 29/002
See application file for complete search history.

(56) References Cited

U.S. PATENT DOCUMENTS

| | | | | |
|---|---|---|---|---|
| 2,432,757 | A * | 12/1947 | Weniger ................. | B01D 45/12 55/432 |
| 5,701,854 | A * | 12/1997 | Hauser ..................... | F01P 5/06 416/189 |
| 6,261,333 | B1 * | 7/2001 | Dickson ................. | F02M 35/02 123/573 |
| 2003/0005825 | A1 * | 1/2003 | Hogan ................... | B01D 53/14 96/282 |
| 2003/0221996 | A1 * | 12/2003 | Svoronos ............... | B01D 50/20 209/1 |
| 2008/0086989 | A1 * | 4/2008 | Sheidler ................. | B01D 45/12 55/345 |
| 2011/0048368 | A1 * | 3/2011 | Nelson ................. | F02M 35/022 55/385.3 |

(Continued)

FOREIGN PATENT DOCUMENTS

| | | |
|---|---|---|
| EP | 2136066 A2 | 12/2009 |
| EP | 3736433 A1 | 11/2020 |

OTHER PUBLICATIONS

European Search Report issued in European Patent Application No. 20215066.0, dated Jun. 7, 2021, 6 pages.

*Primary Examiner* — Dung H Bui

(57) ABSTRACT

A suction assembly for a centrifugal air filter, including an axial fan for generating a cooling air flow and a Venturi nozzle having a flow pipe and an intake port which opens out in a constriction region within the flow pipe. The flow pipe in the outflow direction of the axial fan is penetrated by the cooling air flow in such a manner that a vacuum is initiated in the intake port.

6 Claims, 2 Drawing Sheets

(56) References Cited

U.S. PATENT DOCUMENTS

| | | | |
|---|---|---|---|
| 2013/0022432 A1* | 1/2013 | Spitler | F01P 3/18 165/41 |
| 2014/0090800 A1 | 4/2014 | Dossner et al. | |
| 2016/0177894 A1* | 6/2016 | Duquesne | F02M 35/164 123/41.49 |
| 2017/0276101 A1* | 9/2017 | Morey | F02M 35/024 |
| 2019/0015772 A1* | 1/2019 | Duennwald | B01D 50/20 |

* cited by examiner

SUCTION ASSEMBLY FOR A CENTRIFUGAL AIR FILTER

CROSS-REFERENCE TO RELATED APPLICATIONS

This application claims the benefit of and priority to German patent application no. 102020200950.3, filed Jan. 27, 2020, which is hereby incorporated by reference.

FIELD OF THE DISCLOSURE

The present disclosure relates to a suction assembly for a centrifugal air filter.

BACKGROUND

Centrifugal air filters of this type are typically used as coarse filters for pre-cleaning the charge air of diesel motors which are equipped with a turbocharger. To this end, the centrifugal air filter comprises a multiplicity of individual separators which set an air flow passing therethrough in turbulence such that coarse particles contained in the air flow by virtue of the centrifugal forces caused herein are ejected into a separating region that surrounds the individual separators. A connector port which is provided on a surrounding filter housing and on which a vacuum can be built up such that the coarse particles situated in the separating region can be suctioned to the outside opens into the separating region. The build-up of the vacuum takes place in the region of a fan casing that is penetrated by a cooling air flow, for example, wherein a suction snorkel which is connected to the connector port of the centrifugal air filter opens into a suction region of a fan propeller that rotates within the fan casing. Since the suction snorkel herein usually protrudes into the cooling air flow, undesirable masking of upstream heat exchangers, and thus a corresponding deterioration of the heat discharge, can arise.

SUMMARY

It is therefore an object of the present disclosure to specify a suction assembly of the type mentioned at the outset which is improved with a view to utilizing a cooling air flow for generating a vacuum.

This object is achieved by a suction assembly for a centrifugal air filter according to the present disclosure.

The suction assembly for a centrifugal air filter includes an axial fan for generating a cooling air flow and a Venturi nozzle having a flow pipe and an intake port which opens out in a constriction region within the flow pipe, wherein the flow pipe in the outflow direction of the axial fan is penetrated by the cooling air flow in such a manner that a vacuum is initiated in the intake port. Since the Venturi nozzle is accommodated downstream of the axial fan, any undesirable masking of upstream heat exchangers and an associated deterioration of the heat discharge is precluded from the outset.

Advantageous design embodiments of the suction assembly are described herein according to the present disclosure.

The Venturi nozzle is preferably disposed in a peripheral region of the axial fan. The flow rate of the cooling air flow generated by means of the axial fan, and thus of the vacuum that can be built up in the constriction region of the Venturi nozzle, is at the maximum here.

In order for the installation of the suction assembly to be simplified, there is the possibility that the Venturi nozzle in terms of construction is integrated in a fan casing that surrounds the axial fan. The suction assembly in this case, conjointly with the fan casing, can form an integral construction unit which as a block can be installed in a single operative step.

The Venturi nozzle can also be an integral component part of the fan casing. The construction unit thus formed is produced as an injection-molded plastic part, for example.

BRIEF DESCRIPTION OF THE DRAWINGS

The suction assembly according to the disclosure for a centrifugal air filter will be explained in more detail hereunder by means of the appended drawings. Identical components, or components with equivalent functions, respectively, herein are identified by the same reference signs. In the drawings.

DETAILED DESCRIPTION

Figure 1:
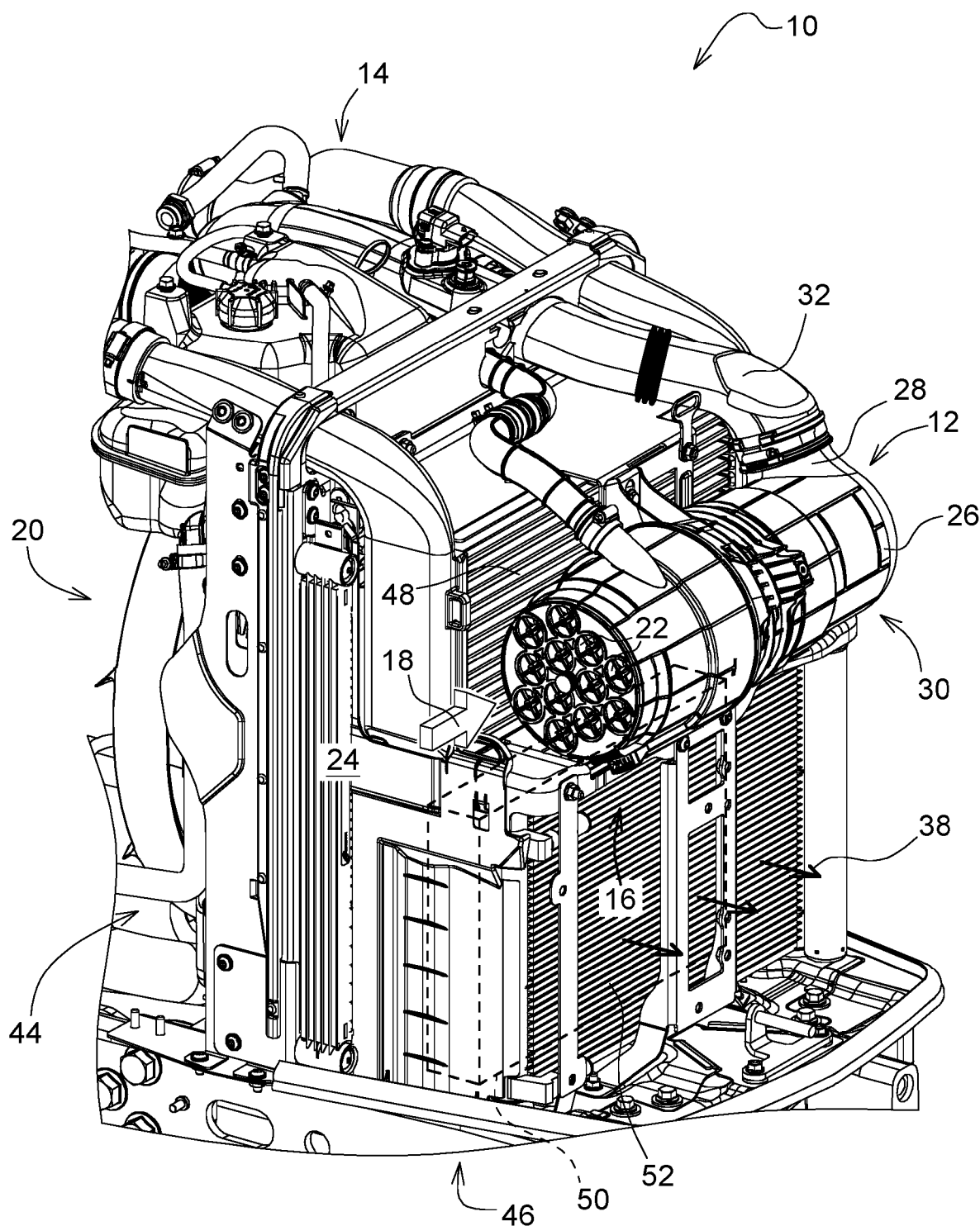
FIG. 1 shows an air filter system in an engine bay of a commercial vehicle configured as an agricultural tractor.
Figure 2:
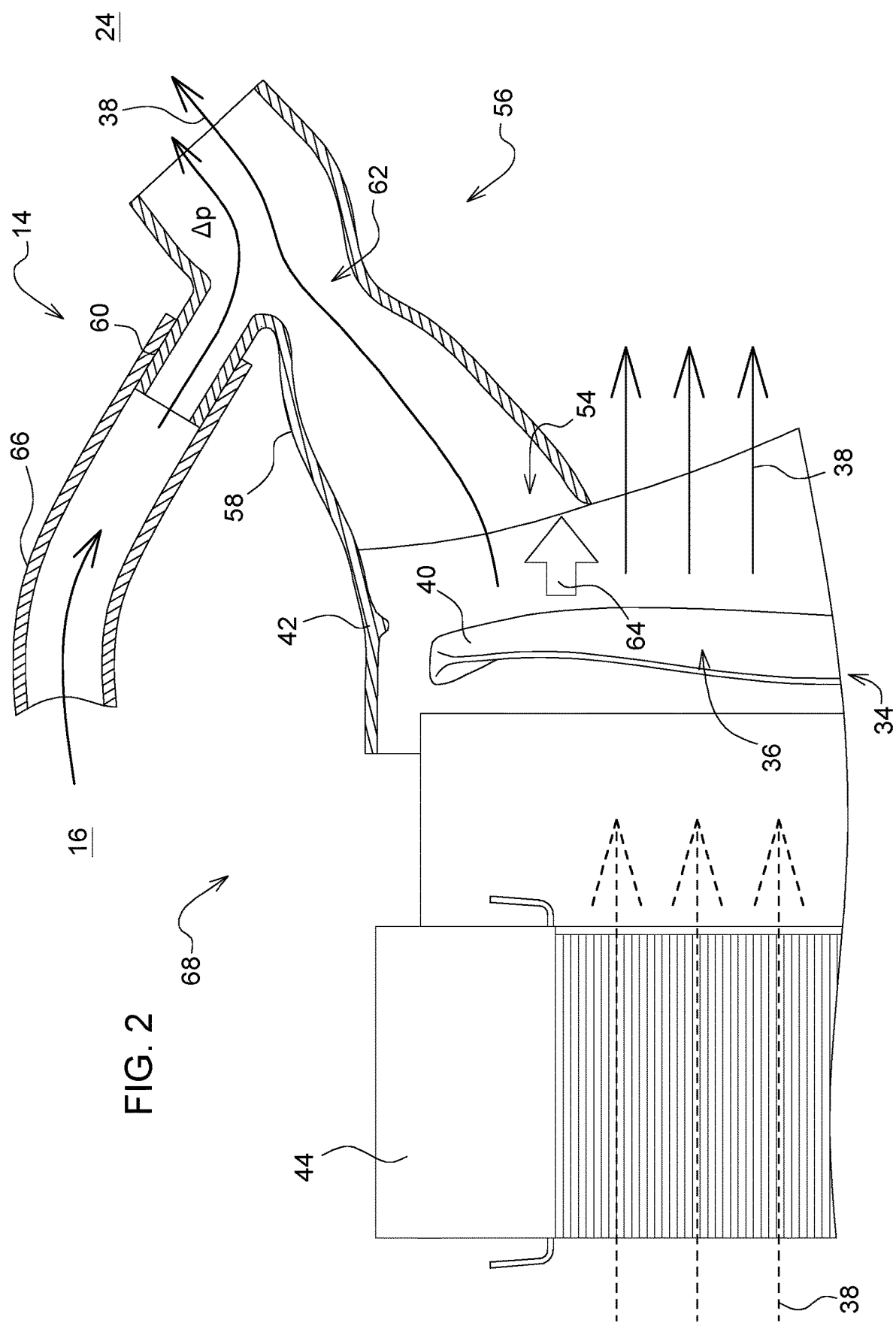
FIG. 2 shows a schematic sectional view of an exemplary embodiment of the suction assembly according to the disclosure for a centrifugal air filter comprised in an air filter system according to FIG. 1.

FIG. 1 shows an air filter system 12 which is accommodated in an engine bay 10 of a commercial vehicle and which is equipped with a suction assembly 14, illustrated in FIG. 2, for operating a centrifugal air filter 16. The view onto the suction assembly 14 in FIG. 1 is obscured by components disposed in front, such that reference in terms of the suction assembly 14 is made to FIG. 2. The air filter system 12 herein serves for cleaning a charge air flow 18 of an internal combustion engine 20 of the commercial vehicle that is configured as a turbocharged diesel motor.

The commercial vehicle in an exemplary manner is an agricultural tractor (not shown). Alternatively, the commercial vehicle can also be configured as a vehicle of any arbitrary other construction mode, such as a construction vehicle or a forestry vehicle.

The air filter system 12 has a centrifugal air filter 16 for the preliminary cleaning of air suctioned from the environment. The centrifugal air filter 16 is composed of a multiplicity of individual separators 22 which set the air suctioned from the environment 24 in turbulence in such a manner that coarse particles contained therein by virtue of the centrifugal forces caused are ejected into a separating region that surrounds the individual separators 22. A connector port 28 which is provided on a surrounding filter housing 26 and on which a vacuum Δp is able to be built up by means of the suction assembly 14 opens into the separating region such that the coarse particles situated in the separating region can be suctioned from the centrifugal air filter 16 to the outside in order for said coarse particles to be removed.

A fine filter 30 which is disposed downstream of the centrifugal air filter 16 cleans the air exiting from the centrifugal air filter 16 in terms of remaining fine particles. The fine filter 30 which is configured as a replaceable filter cartridge is accommodated conjointly with the centrifugal air filter 16 in the filter housing 26. The air cleaned in such a manner is subsequently supplied as charge air to a turbocharger of the diesel motor 20 by way of a hose line 32.

According to FIG. 2, the suction assembly 14 furthermore comprises an axial fan 34 having a fan propeller 36 which for generating a cooling air flow 38 can be set in rotation by way of a belt drive of the diesel motor 20 or a separate electric drive motor. A single fan blade 40 is illustrated in FIG. 2 so as to represent the axial fan 34, or the fan propeller 36. The fan propeller 36 is surrounded by an encircling fan casing 42 which serves for guiding the cooling air flow 38 within the engine bay 10. According to the example, the cooling air flow 38 is suctioned through an upstream heat exchanger 44 which is a component part of a high-temperature cooling system of the diesel motor 20, for example. Besides the heat exchanger 44, further heat exchangers 46 such as, for example, a charge air cooler 48, a transmission oil cooler 50, as well as an air-conditioning condenser 52, which conjointly form a cooler pack which within the engine bay 10 is situated behind a radiator of a surrounding engine hood (not shown) are provided according to FIG. 1.

As can be seen in FIG. 2, the generation of the vacuum Δp takes place by means of a Venturi nozzle 56 which is disposed in a peripheral region 54 of the axial fan 34. The Venturi nozzle 56 is composed of a flow pipe 58 and an intake port 60 which opens into a constriction region 62 within the flow pipe 58. The flow pipe 58 in the outflow direction 64 of the axial fan 34 is penetrated by the cooling air flow 38 in such a manner that a vacuum in relation to the environment 24 is initiated in the intake port 60. The intake port 60 herein is connected to the connector port 28 on the filter housing 26 by way of a connection hose 66 such that the coarse particles separated in the centrifugal air filter 16 are suctioned under the effect of the build-up vacuum Δp and in the constriction region 62 of the flow pipe 58 are entrained into the environment 24 by the cooling air flow 38.

Since the Venturi nozzle 56 is accommodated downstream of the axial fan 34, any undesirable masking of the upstream heat exchangers 44, 46, as well as a deterioration of the heat discharge associated therewith, is precluded from the outset.

In order for the installation of the suction assembly 14 to be simplified, the Venturi nozzle 56 in terms of construction is integrated in the fan casing 42 that surrounds the axial fan 34. The suction assembly 14 in this case, conjointly with the fan casing 42, forms an integral construction unit 68 which as a block can be installed in a single operative step. The Venturi nozzle 56 herein is an integral component part of the fan casing 42. The construction unit 68 thus formed is produced as an injection-molded plastics part.

For the sake of completeness, it should be noted that the centrifugal air filter 16 does not mandatorily have to serve for the preliminary cleaning of the charge air of an internal combustion engine. Said centrifugal air filter 16 can in fact also be a component part of an air filter system of a vehicle cabin ventilation system.

The invention claimed is:

1. A suction assembly for a centrifugal air filter, comprising:
   an axial fan having one or more fan propellers which generates a cooling air flow through a heat exchanger disposed upstream of the axial fan; and
   a Venturi nozzle disposed in a peripheral region of the axial fan, the Venturi nozzle disposed downstream of the heat exchanger and the axial fan, and the Venturi nozzle having a flow pipe and an intake port which opens out in a constriction region within the flow pipe;
   wherein the flow pipe is at least partially disposed in front of and within the periphery of the one or more fan propellers in the outflow direction of the axial fan and is penetrated by the cooling air flow in such a manner that a vacuum is initiated in the intake port.

2. The suction assembly of claim 1, wherein the Venturi nozzle is integrated in a fan casing that surrounds the axial fan.

3. The suction assembly of claim 2, wherein the Venturi nozzle is an integral component part of the fan casing.

4. A commercial vehicle including an air filter system for cleaning a charge air flow of an internal combustion engine, comprising:
   a centrifugal air filter for the preliminary separation of coarse particles in the charge air flow;
   an axial fan having one or more fan propellers which generates a cooling air flow through a heat exchanger disposed upstream of the axial fan; and
   a Venturi nozzle disposed in a peripheral region of the axial fan, the Venturi nozzle disposed downstream of the heat exchanger and the axial fan, and the Venturi nozzle having a flow pipe and an intake port which opens out in a constriction region within the flow pipe;
   wherein the flow pipe is at least partially disposed in front of and within the periphery of the one or more fan propellers in the outflow direction of the axial fan and is penetrated by the cooling air flow in such a manner that a vacuum is initiated in the intake port.

5. The commercial vehicle of claim 4, wherein the Venturi nozzle is integrated in a fan casing that surrounds the axial fan.

6. The commercial vehicle of claim 5, wherein the Venturi nozzle is an integral component part of the fan casing.

* * * * *